US011470062B2

(12) United States Patent
Rajagopalan et al.

(10) Patent No.: US 11,470,062 B2
(45) Date of Patent: Oct. 11, 2022

(54) SECURE REPROGRAMMING OF EMBEDDED PROCESSING SYSTEM

(71) Applicant: United Technologies Corporation, Farmington, CT (US)

(72) Inventors: Jayashree Rajagopalan, Glastonbury, CT (US); Paul A. Adamski, Westfield, MA (US); Jason E. Posniak, Broad Brook, CT (US); Douglas E. Sansom, Suffield, CT (US); David Howland, West Hartford, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 120 days.

(21) Appl. No.: 16/814,277

(22) Filed: Mar. 10, 2020

(65) Prior Publication Data
US 2020/0304471 A1    Sep. 24, 2020

Related U.S. Application Data

(60) Provisional application No. 62/822,076, filed on Mar. 22, 2019.

(51) Int. Cl.
*H04L 29/06* (2006.01)
*H04L 9/40* (2022.01)

(52) U.S. Cl.
CPC .......... *H04L 63/045* (2013.01); *H04L 63/083* (2013.01)

(58) Field of Classification Search
CPC ... H04L 63/045; H04L 63/083; H04L 63/126; H04L 63/08; H04L 63/123; G06F 8/65; G06F 21/31; G06F 21/572
See application file for complete search history.

(56) References Cited

U.S. PATENT DOCUMENTS 10,365,908 B2 *   7/2019   Shepherd .................. G06F 8/71
10,559,193 B2 *   2/2020   Naidoo ............ G08B 13/19695
(Continued)

FOREIGN PATENT DOCUMENTS

| EP | 1916612 A2 | 4/2008 |
| EP | 2642421 A1 | 9/2013 |
| WO | 2018062761 A1 | 4/2018 |

OTHER PUBLICATIONS

EP Application No. 20163769.1 Extended EP Search Report dated Aug. 17, 2020, 7 pages.

*Primary Examiner* — Saleh Najjar
*Assistant Examiner* — Khalid M Almaghayreh
(74) *Attorney, Agent, or Firm* — Cantor Colburn LLP (57) ABSTRACT

An embedded processing system includes processing circuitry, a memory system, and a reprogramming control. The reprogramming control is configured to authenticate a user associated with a reprogramming operation of the embedded processing system and receive an encrypted configuration item. The reprogramming control is further configured to decrypt and authenticate the encrypted configuration item either for storage of the configuration item in the embedded processing system or for transmission externally as an encrypted and signed entity. These operations are performed only after the user requesting such an operation has been authenticated to have the permission to perform the requested operation.

16 Claims, 4 Drawing Sheets

(56) References Cited

U.S. PATENT DOCUMENTS

| | | | | |
|---|---|---|---|---|
| 2008/0101613 A1* | 5/2008 | Brunts | ........... | G06F 21/572 |
| | | | | 380/279 |
| 2012/0254982 A1* | 10/2012 | Sallam | ........... | G06F 21/566 |
| | | | | 726/16 |
| 2014/0359239 A1* | 12/2014 | Hiremane | ........... | G06F 11/0766 |
| | | | | 711/163 |
| 2015/0007262 A1* | 1/2015 | Aissi | ........... | G06F 21/60 |
| | | | | 726/2 |
| 2016/0125397 A1* | 5/2016 | Strydom | ........... | G06Q 20/3672 |
| | | | | 705/66 |
| 2017/0279619 A1* | 9/2017 | Yang | ........... | H04L 9/3268 |
| 2018/0275979 A1* | 9/2018 | Shepherd | ........... | G06F 21/105 |
| 2019/0145315 A1* | 5/2019 | Dow | ........... | F01D 11/24 |
| | | | | 251/305 |
| 2019/0229913 A1* | 7/2019 | Fava | ........... | H04L 9/0891 |
| 2020/0204374 A1* | 6/2020 | Skertic | ........... | H04L 9/3263 |
| 2021/0012008 A1* | 1/2021 | Kim | ........... | H04L 9/0891 |
| 2021/0081536 A1* | 3/2021 | Zhang | ........... | H04L 9/30 |

\* cited by examiner

SECURE REPROGRAMMING OF EMBEDDED PROCESSING SYSTEM

CROSS-REFERENCE TO RELATED APPLICATION

This application claims the benefit of priority to U.S. Provisional Application No. 62/822,076 filed Mar. 22, 2019, the disclosure of which is incorporated herein by reference in its entirety.

BACKGROUND

The subject matter disclosed herein generally relates to embedded processing systems and, more particularly, to a method and an apparatus for secure reprogramming of an embedded processing system.

Embedded processing systems can include control system software that is critical to the physical performance of a control system. For example, a vehicle control system relies on a combination of carefully crafted control processes using a combination of instructions, constant data, and dynamically adjusted data to operate one or more electromechanical systems. If configuration items, such as software and/or data are modified, whether intentionally or unintentionally, the control system may be at risk of exhibiting undesirable behavior and/or degraded performance.

BRIEF DESCRIPTION

According to one embodiment, an embedded processing system includes processing circuitry, a memory system, and a reprogramming control configured to authenticate a user associated with a reprogramming operation of the embedded processing system and receive an encrypted configuration item. The reprogramming control is further configured to decrypt and authenticate the encrypted configuration item as a decrypted and authenticated configuration item responsive to authenticating the user, and store the decrypted and authenticated configuration item in the memory system.

In addition to one or more of the features described above or below, or as an alternative, further embodiments may include where the reprogramming control is further configured to authenticate the user based on one or more user credentials received from a reprogramming system and user authentication data stored in the embedded processing system.

In addition to one or more of the features described above or below, or as an alternative, further embodiments may include where the reprogramming control is further configured to receive a transaction indicator associated with the encrypted configuration item.

In addition to one or more of the features described above or below, or as an alternative, further embodiments may include where authentication of the user is based on the transaction indicator, the one or more user credentials received from the reprogramming system, and the user authentication data.

In addition to one or more of the features described above or below, or as an alternative, further embodiments may include where the reprogramming control is further configured to receive transmitted cryptographic information including one or more encryption parameters associated with the encrypted configuration item.

In addition to one or more of the features described above or below, or as an alternative, further embodiments may include where the reprogramming control is further configured to use the transmitted cryptographic information and stored cryptographic information to decrypt the encrypted configuration item.

In addition to one or more of the features described above or below, or as an alternative, further embodiments may include where the transmitted cryptographic information is stored for a transaction duration within the embedded processing system and erased upon completion of a load transaction, and the stored cryptographic information is retained after completion of the load transaction.

In addition to one or more of the features described above or below, or as an alternative, further embodiments may include configuration item authentication includes one or more asymmetric cryptographic methods using unique key pairs that result in an authentication failure based on an incorrect key, a missing key, or software that is tampered with resulting in an authentication failure.

In addition to one or more of the features described above or below, or as an alternative, further embodiments may include where the reprogramming control is further configured to encrypt a configuration item extracted from the memory system prior to transferring the configuration item external to the embedded processing system.

In addition to one or more of the features described above or below, or as an alternative, further embodiments may include where the embedded processing system is a controller of a gas turbine engine, and the encrypted configuration item includes an application configured to control operation of the gas turbine engine.

According to an embodiment, a method includes authenticating, by a reprogramming control of an embedded processing system, a user associated with a reprogramming operation of the embedded processing system, and receiving an encrypted configuration item at the embedded processing system. The method also includes decrypting and authenticating, by the reprogramming control, the encrypted configuration item as a decrypted and authenticated configuration item responsive to authenticating the user, and storing the decrypted and authenticated configuration item in a memory system of the embedded processing system.

A technical effect of the apparatus, systems and methods is achieved by secure reprogramming of an embedded processing system as described herein.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
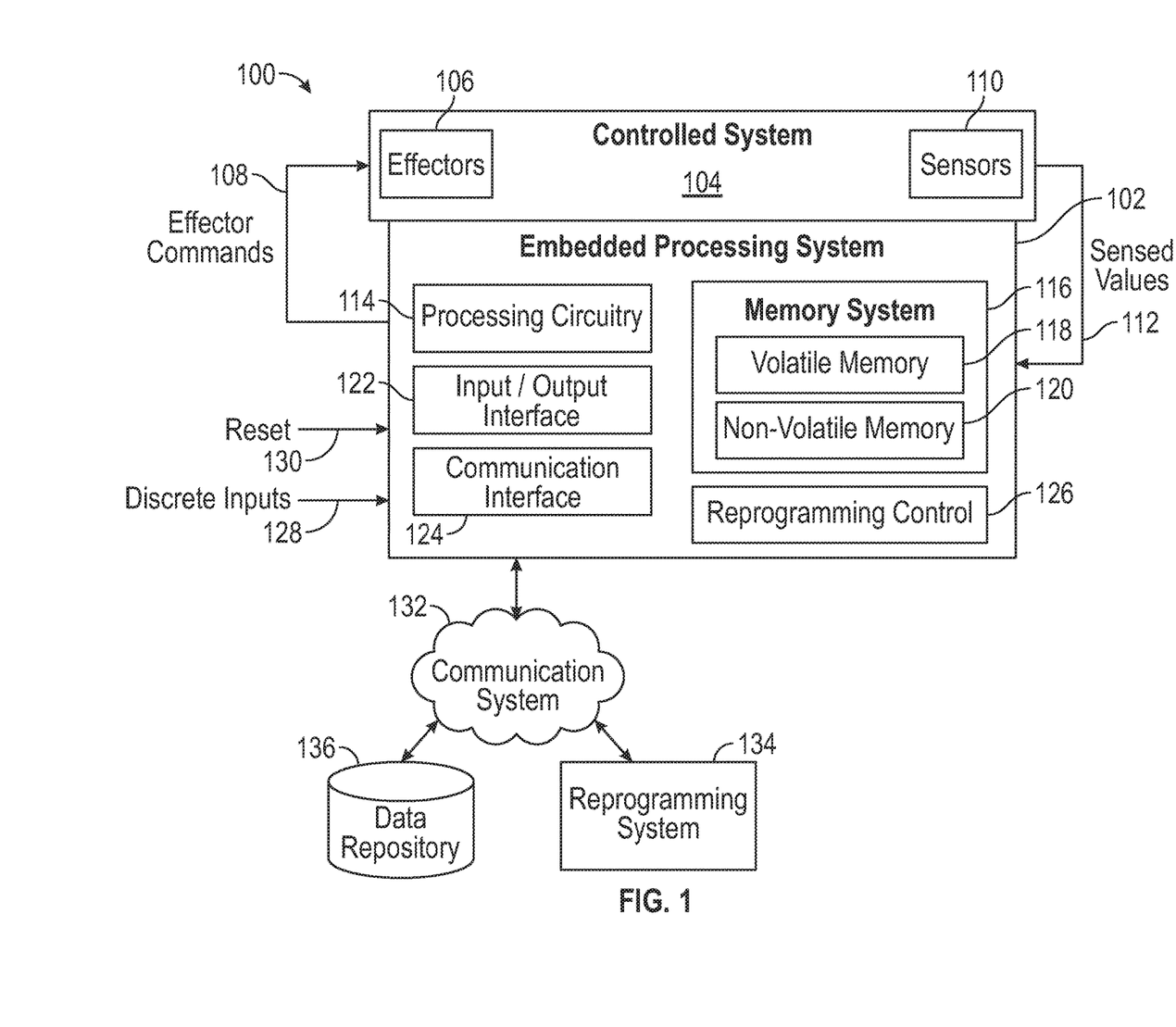
FIG. 1 is a block diagram of a system, in accordance with an embodiment of the disclosure.

Referring now to the drawings, FIG. 1 illustrates a system 100 that includes an embedded processing system 102 and a controlled system 104. The controlled system 104 can be any type of physical system that includes one or more effectors 106 controlled by one or more effector commands 108 generated by the embedded processing system 102. Examples of effectors 106 can include one or more motors, solenoids, valves, relays, pumps, heaters, and/or other such actuation control components. A plurality of sensors 110 can capture state data associated with the controlled system 104 and provide sensed values 112 as feedback to the embedded processing system 102 to enable closed-loop control of the controlled system 104 according to one or more control laws. Examples of the sensors 110 can include one or more temperature sensors, pressure sensors, strain gauges, level sensors, accelerometers, rate sensors, and the like. The controlled system 104 can be an engine, a vehicle, a heating, ventilating, and air conditioning system, an elevator system, industrial machinery, or the like. For purposes of explanation, embodiments are primarily described with respect to an engine system of an aircraft as the controlled system 104, such as a gas turbine engine, where the embedded processing system 102 may provide one or more control channels and/or monitoring systems of a controller (e.g., a full authority digital engine control) of one or more gas turbine engines.

In the example of FIG. 1, the embedded processing system 102 includes processing circuitry 114 and a memory system 116 configured to store a plurality of configuration items, where at least one of the configuration items includes a sequence of the computer executable instructions for execution by the processing circuitry 114. Other types of configuration items can include data, such as constants, configurable data, and/or fault data. Examples of computer executable instructions can include boot software, operating system software, and/or application software. The executable instructions may be stored or organized in any manner and at any level of abstraction, such as in connection with controlling and/or monitoring operation of the controlled system 104. The processing circuitry 114 can be any type or combination of central processing unit (CPU), including one or more of: a microprocessor, a digital signal processor (DSP), a microcontroller, an application specific integrated circuit (ASIC), a field programmable gate array (FPGA), or the like. Also, in embodiments, the memory system 116 may include volatile memory 118, such as random access memory (RAM), and non-volatile memory 120, such as Flash memory, read only memory (ROM), and/or other electronic, optical, magnetic, or any other computer readable medium onto which is stored data and algorithms in a non-transitory form.

The embedded processing system 102 can also include one or more of an input/output interface 122, a communication interface 124, a reprogramming control 126, and/or other elements (not depicted). The input/output interface 122 can include support circuitry for interfacing with the effectors 106 and sensors 110, such as filters, amplifiers, digital-to-analog converters, analog-to-digital converters, and other such circuits to support digital and/or analog interfaces. Further, the input/output interface 122 can receive or output signals to/from other sources. As one example, discrete inputs 128 can be input to the input/output interface 122 to establish an operating mode of the embedded processing system 102 or to trigger actions by the embedded processing system 102. A reset signal 130 may also be received as a signal by the input/output interface 122 or may interface with other circuitry of the embedded processing system 102, such as power conditioning circuitry (not depicted), where the reset signal 130 can trigger a mode of operation check that enables the reprogramming control 126. The communication interface 124 can be communicatively coupled to a communication system 132, which can include one or more direct or networked communication links to systems, such as a reprogramming system 134, a data repository 136, or another system (not depicted). The reprogramming system 134 can be any type of computer system operable to load new/updated configuration items to the embedded processing system 102 for storage in the memory system 116. The reprogramming system 134 can interface to the communication system 132 through a wired, wireless, optical, or magnetic coupling. The data repository 136 can serve as a data source for updating the memory system 116, for instance, with control system data, or as a data sink to offload and clear data from the memory system 116, such as fault data, history data, and the like.

In embodiments, the reprogramming control 126 can be implemented in dedicated circuitry, such as an application specific integrated circuit, programmable logic device, field programmable gate array, or the like. Alternatively, the reprogramming control 126 can be implemented in software, such as boot software. In some embodiments, a processing core of the processing circuitry 114 can be dedicated for use by the reprogramming control 126. The reprogramming control 126 can be configured to implement embodiments as further described herein.

Figure 2:
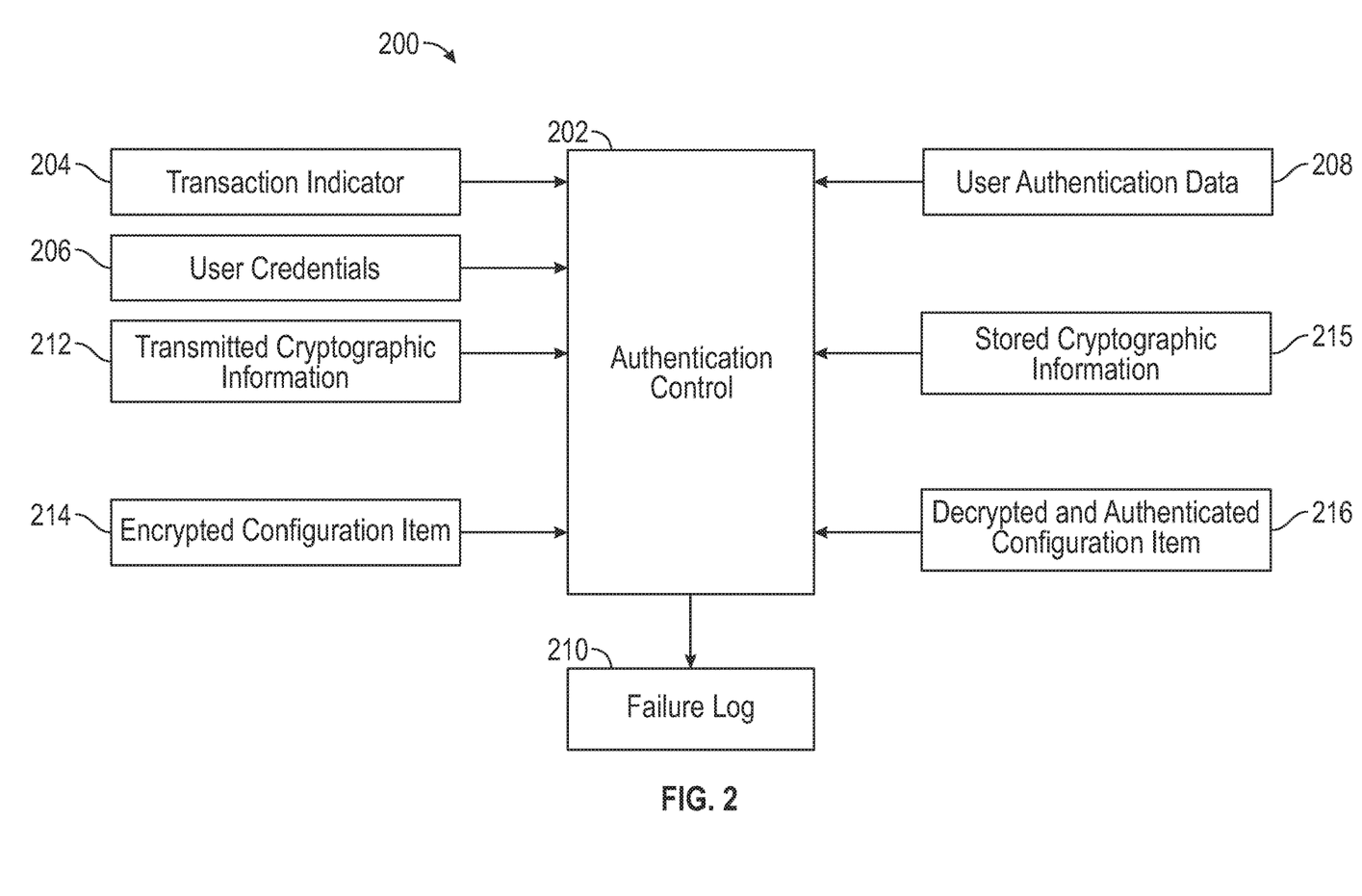
FIG. 2 is a block diagram of an authentication system, in accordance with an embodiment of the disclosure.

Referring now to FIG. 2, an example of an authentication system 200 is depicted that can be part of the reprogramming control 126 of FIG. 1. The authentication system 200 of FIG. 2 can include an authentication control 202 configured to receive a transaction indicator 204 and user credentials 206 to support user authentication with user authentication data 208 as part of a reprogramming process of the embedded processing system 102 of FIG. 1. The transaction indicator 204 and user credentials 206 can be received at the reprogramming control 126 of FIG. 1 from the reprogramming system 134 via communication system 132 and communication interface 124 of FIG. 1. User authentication data 208 can be defined for particular users or classes of users, such as equipment-owner users, maintenance technicians, engineering users, and the like. The transaction indicator 204 may indicate a type of configuration item or reprogramming option desired by a user of the reprogramming system 134. For example, an equipment-owner user may have authority to clear fault data records or set a subset of configuration parameters in the memory system 116 of FIG. 1. A maintenance technician may have authority to adjust trimmable constants or reprogram certain regions of the non-volatile memory 120 of FIG. 1. An engineering user may have authority to reprogram an operating system, boot program code, or application software in the non-volatile memory 120, in addition to having permissions of the maintenance technician and the equipment-owner user. If user authentication fails, for instance, by the user credentials 206 not being recognized with respect to the user authentication data 208, or user permissions associated with the transaction indicator 204 do not align with expected permissions of the user authentication data 208, then the authentication control 202 can record the failure in a failure log 210.

The authentication control 202 can also receive transmitted cryptographic information 212 and an encrypted configuration item 214 from the reprogramming system 134 via communication system 132 and communication interface 124 of FIG. 1. The authentication control 202 can apply a cryptographic algorithm using one or more parameters received in the transmitted cryptographic information 212 and stored cryptographic information 215 to decrypt the encrypted configuration item 214. The transmitted cryptographic information 212 and stored cryptographic information 215 can be used together for decryption based on 'shared secrets' such that not all of the information is sent from outside of the embedded processing system 102 of FIG. 1 nor stored completely within the embedded processing system 102. After decryption, authenticity of the configuration item can be verified using, for example, a digital signature of the configuration item. The resulting file can be a decrypted and authenticated configuration item 216, which may be temporarily stored in volatile memory 118 or otherwise buffered during authentication and written by the reprogramming control 126 into the non-volatile memory 120 of FIG. 1 upon authentication. The authentication control 202 can acknowledge successful completion of decryption, authentication, and writing of the decrypted and authenticated configuration item 216 in the memory system 116 of FIG. 1 with a response to the reprogramming system 134. If an error is detected, the error can be logged in the failure log 210, and the reprogramming system 134 can be notified of the error condition.

Figure 3:
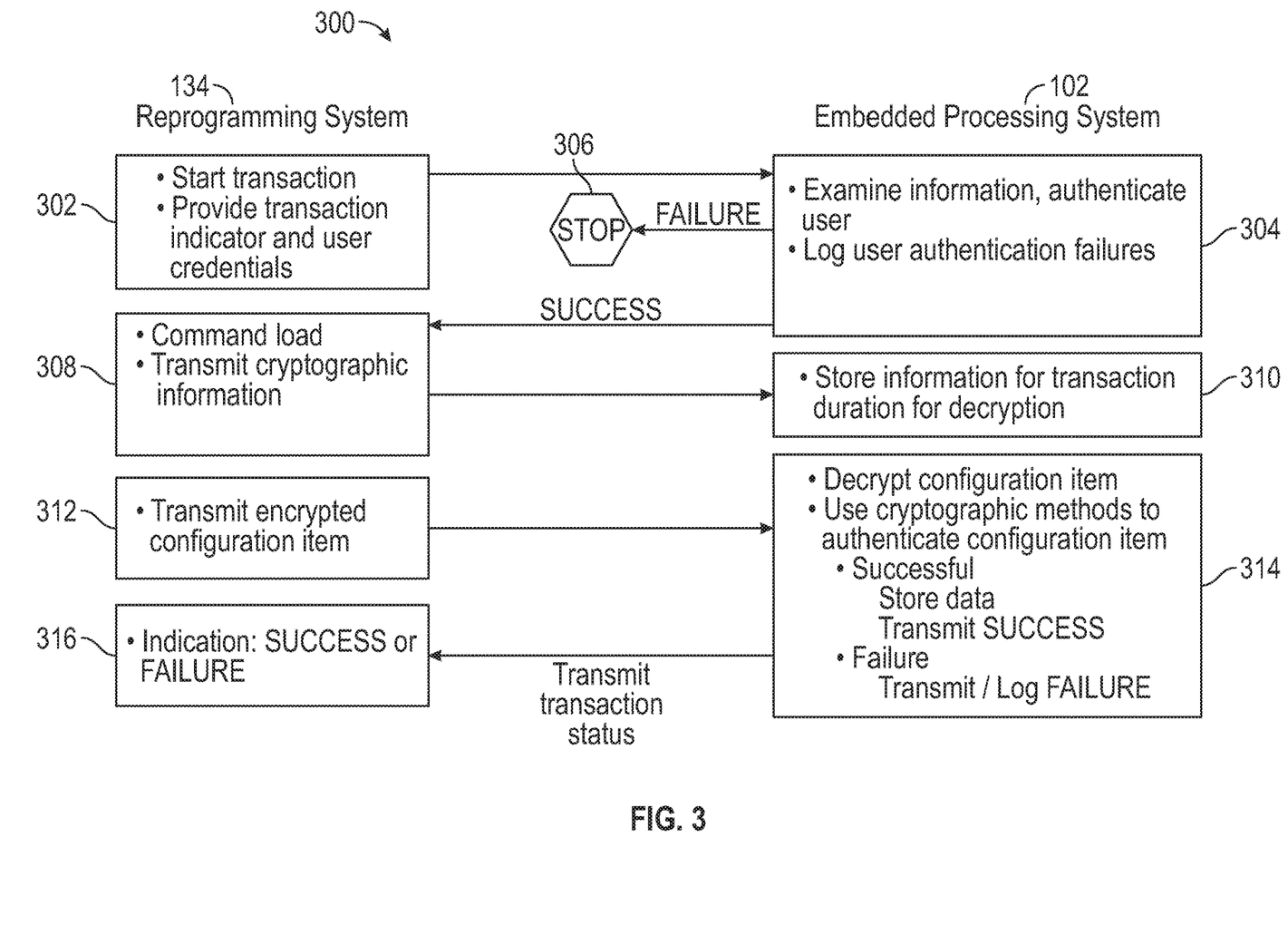
FIG. 3 is a block diagram of a reprogramming process, in accordance with an embodiment of the disclosure.

FIG. 3 depicts an example of a reprogramming process 300 that can be performed by the system 100 of FIG. 1 and is described in reference to FIGS. 1 and 2. At block 302, the reprogramming system 134 can start a transaction and provide a transaction indicator 204 and user credentials 206 to the embedded processing system 102. At block 304, the embedded processing system 102 can examine the information and authenticate the user based on the transaction indicator 204, the one or more user credentials 206 received from the reprogramming system 134, and the user authentication data 208. If an authentication failure is detected at block 304, the embedded processing system 102 can log the failure in the failure log 210 of FIG. 2. Upon a failure, the reprogramming process 300 can be stopped at block 306. Based on a successful authentication, a success indicator can be returned to the reprogramming system 134 at block 308. At block 308, the reprogramming system 134 can transmit a load command and the transmitted cryptographic information 212. At block 310, the embedded processing system 102 can store information for a transaction duration to enable decryption based on the transmitted cryptographic information 212. The transmitted cryptographic information 212 can be temporarily stored in the volatile memory 118 of FIG. 1 while the transaction is in process and be erased upon completion of the load transaction. In contrast, the stored cryptographic information 215 is retained and not erased upon completion of the load transaction.

At block 312, the reprogramming system 134 can transmit an encrypted configuration item 214. The embedded processing system 102 can use the transmitted cryptographic information 212 and stored cryptographic information 215 to decrypt the encrypted configuration item 214 and use cryptographic methods to authenticate the configuration item at block 314. Configuration item authentication can include one or more asymmetric cryptographic methods using unique key pairs that result in an authentication failure based on an incorrect key, a missing key, or software that is tampered with resulting in the authentication failure. For instance, if an incorrect key was used to sign the software, the corresponding key pair does not exist in the embedded processing system 102, or the software was tampered with, an authentication result may be a failure of a signature to authenticate. As a further example, an authentication failure can be detected for a memory range due to tampering of the memory content in the address range when the correct key exists. If authentication is successful, the decrypted and authenticated configuration item 216 can be stored to the memory system 116 and a success indicator can be transmitted to the reprogramming system 134. If the authentication fails at block 314, a failure indicator can be transmitted to the reprogramming system 134, and the failure can be logged in the failure log 210. At block 316, the reprogramming system 134 can receive the success or failure indicator from the embedded processing system 102 and display the result to a user of the reprogramming system 134.

Thus, rather than using a technique, such as a cyclic redundancy check (CRC) to confirm that underlying data has not been modified, embodiments of the invention can use cryptographic technology to protect from tampering in combination with decryption and validation, making it more difficult to corrupt a configuration item without detection. Embodiments of the invention can use cryptographic algorithms to ensure the integrity of the software that is loaded into the embedded processing system 102. Encryption of the encrypted configuration item 214 can be performed at a point of origin where a loadable/executable file is created. Thus, the reprogramming system 134 may not be able to decrypt and/or modify the encrypted configuration item 214 without an authentication error being detected by the embedded processing system 102.

Figure 4:
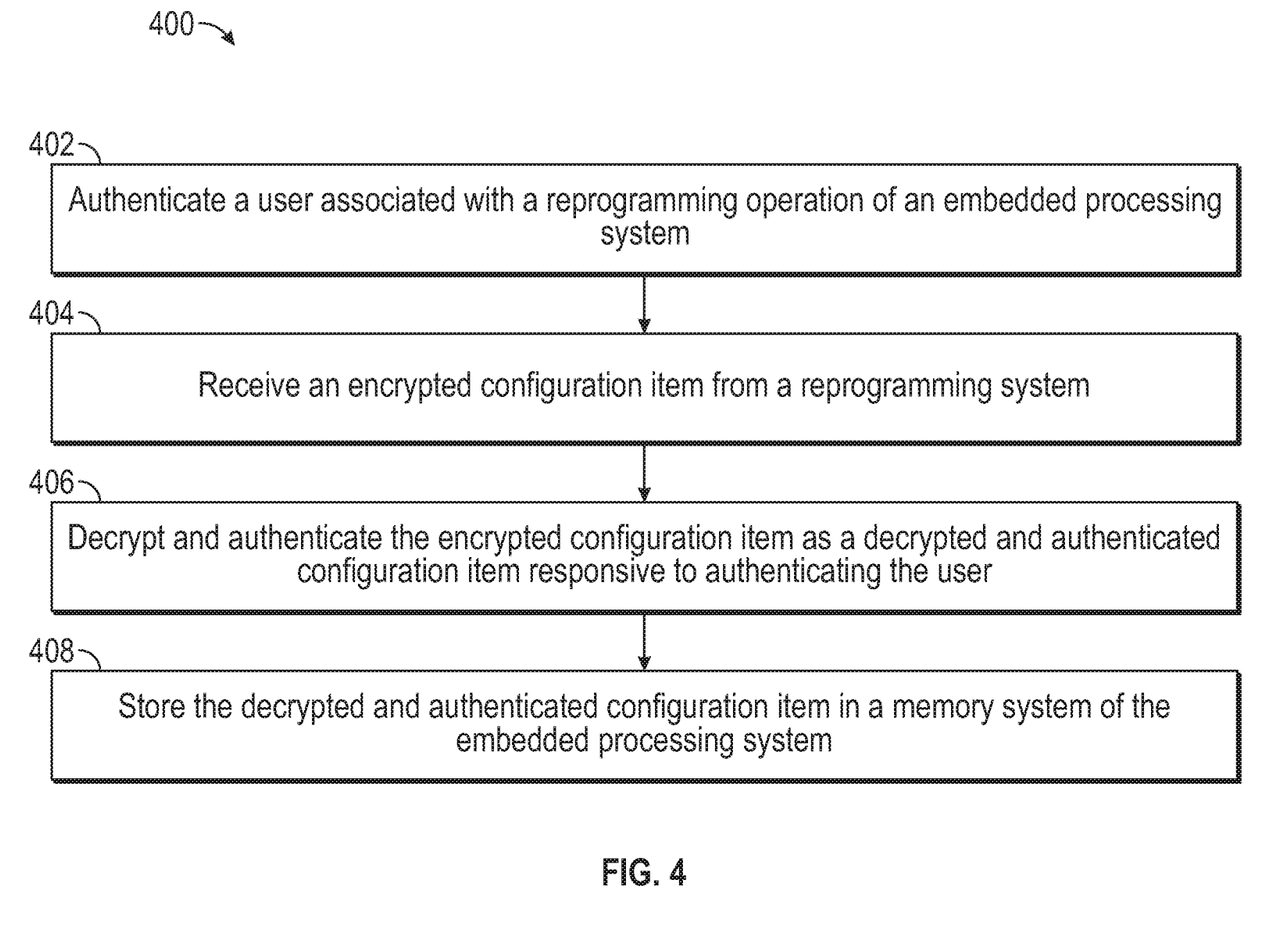
FIG. 4 is a flow chart illustrating a method, in accordance with an embodiment of the disclosure.

Referring now to FIG. 4 with continued reference to FIGS. 1-3, FIG. 4 is a flow chart illustrating a method 400 for secure reprogramming of the embedded processing system 102 of FIG. 1, in accordance with an embodiment. The method 400 may be performed, for example, by the reprogramming control 126 of FIG. 1.

At block 402, the reprogramming control 126 can authenticate a user associated with a reprogramming operation of the embedded processing system 102. At block 404, the reprogramming control 126 can receive an encrypted configuration item 214. At block 406, the reprogramming control 126 can decrypt and authenticate the encrypted configuration item 214, using the transmitted cryptographic information 212 and the stored cryptographic information 215, as a decrypted and authenticated configuration item 216 responsive to authenticating the user. At block 408, the reprogramming control 126 can store the decrypted and authenticated configuration item 216 in the memory system 116.

In embodiments, the reprogramming control 126 can be further configured to authenticate the user based on one or more user credentials 206 received from the reprogramming system 134 and user authentication data 208 stored in the embedded processing system 102. The reprogramming control 126 can be further configured to receive a transaction indicator 204 associated with the encrypted configuration item 214. The reprogramming control 126 can receive transmitted cryptographic information 212 including one or more encryption parameters (e.g., digital signatures) associated with the encrypted configuration item 214. The reprogramming control 126 can be configured to use the transmitted cryptographic information 212 and stored cryptographic information 215 to decrypt the encrypted configuration item 214. The transmitted cryptographic information 212 can be stored for a transaction duration within the embedded processing system 102 and erased upon completion of a load transaction, while the stored cryptographic information 215 was already stored and remains stored for use in future transactions. The reprogramming control 126 can be configured to encrypt a configuration item extracted from the memory system 116 prior to transferring the configuration item external to the embedded processing system 102. In some embodiments, the embedded processing system 102 can be a controller of a gas turbine engine, and the encrypted configuration item 214 can be an application configured to control operation of the gas turbine engine.

While the above description has described the flow process of FIG. 4 in a particular order, it should be appreciated that unless otherwise specifically required in the attached claims that the ordering of the steps may be varied.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An embedded processing system comprising:
   processing circuitry;
   a memory system; and
   a reprogramming control configured to:
      authenticate a user associated with a reprogramming operation of the embedded processing system;
      receive transmitted cryptographic information comprising one or more encryption parameters associated with the encrypted configuration item, wherein the transmitted cryptographic information is received from a reprogramming system after an authentication success indicator is sent to the reprogramming system and prior to receiving an encrypted configuration item from the reprogramming system;
      receive the encrypted configuration item, wherein the embedded processing system is a controller of a gas turbine engine, and the encrypted configuration item comprises an application, the application comprising a sequence of executable instructions configured to control operation of the gas turbine engine;
      decrypt and authenticate the encrypted configuration item as a decrypted and authenticated configuration item responsive to authenticating the user, wherein the transmitted cryptographic information and stored cryptographic information are used to decrypt the encrypted configuration item; and
      store the decrypted and authenticated configuration item in the memory system; and
   wherein the processing circuitry is configured to execute the application to control the gas turbine engine after the decrypted and authenticated configuration item is stored in the memory system.

2. The embedded processing system of claim 1, wherein the reprogramming control is further configured to authenticate the user based on one or more user credentials received from the reprogramming system and user authentication data stored in the embedded processing system.

3. The embedded processing system of claim 2, wherein the reprogramming control is further configured to receive a transaction indicator associated with the encrypted configuration item.

4. The embedded processing system of claim 3, wherein authentication of the user is based on the transaction indicator, the one or more user credentials received from the reprogramming system, and the user authentication data.

5. The embedded processing system of claim 1, wherein the transmitted cryptographic information is stored for a transaction duration within the embedded processing system and erased upon completion of a load transaction, and the stored cryptographic information is retained after completion of the load transaction.

6. The embedded processing system of claim 1, wherein the decrypted and authenticated configuration item is authenticated by one or more asymmetric cryptographic methods using unique key pairs that result in an authentication failure based on an incorrect key, a missing key, or software that is tampered with resulting in an authentication failure.

7. The embedded processing system of claim 1, wherein the reprogramming control is further configured to encrypt a configuration item extracted from the memory system and transfer the configuration item to a communication system that is external to the embedded processing system.

8. The embedded processing system of claim 1, wherein the reprogramming control is further configured to detect an authentication failure for a memory address range due to tampering of memory content in the memory address range.

9. A method comprising:
   authenticating, by a reprogramming control in an embedded processing system, a user associated with a reprogramming operation of the embedded processing system;
   receiving transmitted cryptographic information comprising one or more encryption parameters associated with the encrypted configuration item, wherein the transmitted cryptographic information is received from a reprogramming system after an authentication success indicator is sent to the reprogramming system and prior to receiving an encrypted configuration item from the reprogramming system;
   receiving the encrypted configuration item at the embedded processing system, wherein the embedded processing system is a controller of a gas turbine engine, and the encrypted configuration item comprises an application, the application comprising a sequence of executable instructions configured to control operation of the gas turbine engine;
   decrypting and authenticating, by the reprogramming control, the encrypted configuration item as a decrypted and authenticated configuration item responsive to authenticating the user, wherein the transmitted cryptographic information and stored cryptographic information are used to decrypt the encrypted configuration item;

storing the decrypted and authenticated configuration item in a memory system of the embedded processing system; and executing the application, by the embedded processing system, to control the gas turbine engine after the decrypted and authenticated configuration item is stored in the memory system.

10. The method of claim 9, further comprising:

authenticating the user based on one or more user credentials received from the reprogramming system and user authentication data stored in the embedded processing system.

11. The method of claim 10, further comprising:

receiving a transaction indicator associated with the encrypted configuration item.

12. The method of claim 11, wherein authentication of the user is based on the transaction indicator, the one or more user credentials received from the reprogramming system, and the user authentication data.

13. The method of claim 9, further comprising:

storing the transmitted cryptographic information for a transaction duration within the embedded processing system; and erasing the transmitted cryptographic information upon completion of a load transaction while retaining the stored cryptographic information after completion of the load transaction.

14. The method of claim 9, wherein the decrypted and authenticated configuration item is authenticated by one or more asymmetric cryptographic methods using unique key pairs that result in an authentication failure based on an incorrect key, a missing key, or software that is tampered with resulting in an authentication failure.

15. The method of claim 9, further comprising:

encrypting a configuration item extracted from the memory system; and transferring the configuration item to a communication system that is external to the embedded processing system.

16. The method of claim 9, further comprising:

detecting an authentication failure for a memory address range due to tampering of memory content in the memory address range.

* * * * *